(12) United States Patent
Luo et al.

(10) Patent No.: US 11,427,135 B2
(45) Date of Patent: Aug. 30, 2022

(54) ROTATING MECHANISM FOR DISPLAY TERMINAL AND VEHICLE

(71) Applicant: BYD COMPANY LIMITED, Guangdong (CN)

(72) Inventors: Zhongliang Luo, Shenzhen (CN); Chao Cui, Shenzhen (CN); Haishan Yang, Shenzhen (CN); Weibing Zhao, Shenzhen (CN); Sheng Bai, Shenzhen (CN)

(73) Assignee: BYD COMPANY LIMITED, Guangdong (CN)

( * ) Notice: Subject to any disclaimer, the term of this patent is extended or adjusted under 35 U.S.C. 154(b) by 84 days.

(21) Appl. No.: 16/969,097

(22) PCT Filed: Jan. 30, 2019

(86) PCT No.: PCT/CN2019/073954
§ 371 (c)(1),
(2) Date: Aug. 11, 2020

(87) PCT Pub. No.: WO2019/154227
PCT Pub. Date: Aug. 15, 2019

(65) Prior Publication Data
US 2021/0031702 A1 Feb. 4, 2021

(30) Foreign Application Priority Data

Feb. 11, 2018 (CN) .......................... 201810142915.4
Feb. 11, 2018 (CN) .......................... 201820253755.6

(51) Int. Cl.
*B60R 11/02* (2006.01)
*B60K 35/00* (2006.01)
*B60R 11/00* (2006.01)

(52) U.S. Cl.
CPC .......... *B60R 11/0235* (2013.01); *B60K 35/00* (2013.01); *B60K 2370/67* (2019.05);
(Continued)

(58) Field of Classification Search
CPC ................ B60K 2370/67; B60K 35/00; B60R 11/0235; B60R 2011/0085; B60R 2011/0092
See application file for complete search history.

(56) References Cited

U.S. PATENT DOCUMENTS 4,475,705 A * 10/1984 Henneberg ........... A47B 21/045
248/231.81
5,067,576 A * 11/1991 Bober ...................... B62D 6/00
180/446
(Continued)

FOREIGN PATENT DOCUMENTS

CN 101016972 A 8/2007
CN 101318486 A 12/2008
(Continued)

OTHER PUBLICATIONS

English Translation of International Search Report from PCT/CN2019/073954 dated Apr. 25, 2019 (2 pages).

*Primary Examiner* — Peter D Le
(74) *Attorney, Agent, or Firm* — Calfee Halter & Griswold LLP

(57) ABSTRACT

This application discloses a rotating mechanism for a display terminal and a vehicle having the same. The rotating mechanism includes: a mounting unit, a clutch unit, and a drive unit, the mounting unit being configured to mount a display terminal, the clutch unit including a first engaging portion and a second engaging portion, the first engaging portion being connected to the mounting unit, and the drive unit having a power output member capable of outputting torque, the power output member being detachably con- (Continued)

nected to the second engaging portion and capable of transmitting torque, and the first engaging portion and the second engaging portion being in power coupling connection.

20 Claims, 7 Drawing Sheets

(52) U.S. Cl.
CPC ............ *B60R 2011/0085* (2013.01); *B60R 2011/0092* (2013.01)

(56) References Cited

U.S. PATENT DOCUMENTS

| | | | | |
|---|---|---|---|---|
| 5,398,991 | A * | 3/1995 | Smith | A47C 7/723 297/188.16 |
| 6,588,302 | B1 * | 7/2003 | Palmowski | H02G 1/1265 81/9.51 |
| 2001/0047674 | A1 * | 12/2001 | Meisser | H01R 43/0488 72/20.1 |
| 2002/0149708 | A1 * | 10/2002 | Nagata | B60R 11/0211 348/837 |
| 2005/0105193 | A1 * | 5/2005 | Kawanabe | G02B 7/023 359/694 |
| 2006/0061464 | A1 * | 3/2006 | Okada | B60G 17/0195 340/459 |
| 2006/0264154 | A1 * | 11/2006 | Mizuno | B24B 9/148 451/5 |
| 2007/0009861 | A1 * | 1/2007 | Heinrich | B25J 11/00 434/29 |
| 2007/0119790 | A1 * | 5/2007 | Yoshinaka | B60R 11/0235 211/4 |
| 2008/0036979 | A1 * | 2/2008 | Yang | G09F 11/26 353/86 |
| 2008/0040887 | A1 | 2/2008 | Dickerson | |
| 2010/0059643 | A1 * | 3/2010 | Handa | B60R 11/0235 248/274.1 |
| 2012/0289380 | A1 * | 11/2012 | Chen | A63B 22/001 482/52 |
| 2016/0032508 | A1 * | 2/2016 | Tokura | D05B 21/00 112/102.5 |
| 2017/0191607 | A1 * | 7/2017 | Huang | F16M 11/10 |
| 2019/0195317 | A1 * | 6/2019 | Shi | F16H 3/097 |
| 2021/0024011 | A1 * | 1/2021 | Sakata | H04N 5/2253 |

FOREIGN PATENT DOCUMENTS

| | | |
|---|---|---|
| CN | 102971214 A | 3/2013 |
| CN | 205059452 U | 3/2016 |
| CN | 106740542 A | 5/2017 |
| CN | 206436931 U | 8/2017 |
| CN | 107235012 A | 10/2017 |
| CN | 107344530 A | 11/2017 |
| CN | 107539366 A | 1/2018 |
| JP | 2000330475 A | 11/2000 |

* cited by examiner

ROTATING MECHANISM FOR DISPLAY TERMINAL AND VEHICLE

CROSS-REFERENCE TO RELATED APPLICATIONS

This application is the National Stage of International Application No. PCT/CN2019/073954, filed on Jan. 30, 2019, which claims priority to Chinese Patent Application No. 201810142915.4 and No. 201820253755.6, filed by BYD Company Limited on Feb. 11, 2018, and entitled "ROTATING MECHANISM FOR DISPLAY TERMINAL AND VEHICLE HAVING THE SAME", the entire contents of which are herein incorporated by reference.

FIELD

This application relates to the field of vehicle technologies, and in particular, to a rotating mechanism for a display terminal and a vehicle.

BACKGROUND

With the increasing requirements of modern cars for entertainment and intelligence, and the increasing popularity of mobile devices, functions and forms of multimedia have become increasingly abundant. A multi-functional and large-size touch screen that can be interconnected with a mobile phone and a computer and connected to the Internet has become the mainstream trend in the future. However, at present, most of the touch screens are fixed directly to an instrument panel in a single mode of horizontal screen or vertical screen. This form cannot achieve equal-scale, full-screen display when facing image resources such as pictures and videos of different specifications, and cannot take into account personal usage habits of different users.

SUMMARY

This application is intended to resolve at least one of technical problems in the related art to some extent.

To this end, this application proposes a rotating mechanism for a display terminal, which can implement automatic rotation of the display terminal, thereby implementing rotation of the display terminal at any angle or rotation at a preset angle on a plane on which a display screen is located.

This application further proposes a vehicle having the rotating mechanism.

The rotating mechanism for the display terminal according to this application includes: a mounting unit, a clutch unit, and a drive unit, the mounting unit being configured to mount a display terminal; the clutch unit including a first engaging portion and a second engaging portion, the first engaging portion being connected to the mounting unit; and the drive unit having a power output member capable of outputting torque, the power output member being detachably connected to the second engaging portion and capable of transmitting torque, and the first engaging portion and the second engaging portion being in power coupling connection.

To this end, the rotating mechanism can implement automatic rotation of the display terminal, thereby implementing rotation of the display terminal at any angle or rotation at a preset angle on a plane on which a display screen is located.

Other aspects and advantages of this application will be given in the following description, some of which will become apparent from the following description or may be learned from practices of this application.

DETAILED DESCRIPTION

The following describes embodiments of the present invention in detail. Examples of the embodiments are shown in the accompanying drawings, and same or similar reference signs in all the accompanying drawings indicate same or similar components or components having same or similar functions. The embodiments described below with reference to the accompanying drawings are exemplary, and are intended to explain this application and cannot be construed as a limitation to this application.

A rotating mechanism 100 for a display terminal 300 according to an embodiment of this application is described in detail below with reference to FIG. 1 to FIG. 13.

Figure 1:
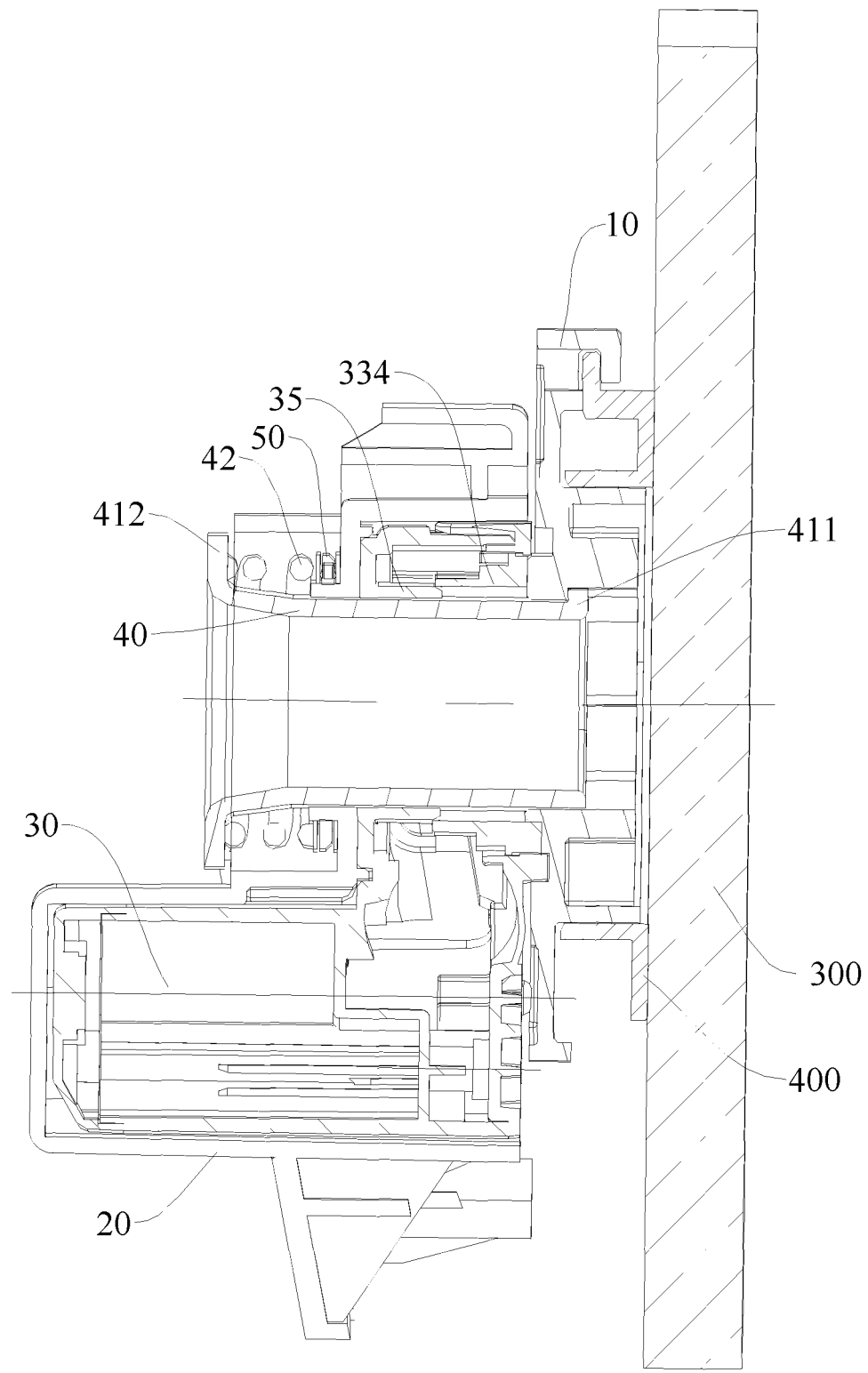
FIG. 1 is a schematic diagram of a rotating mechanism for a display terminal, a display terminal, and a fixing bracket according to an embodiment of this application.
Figure 2:
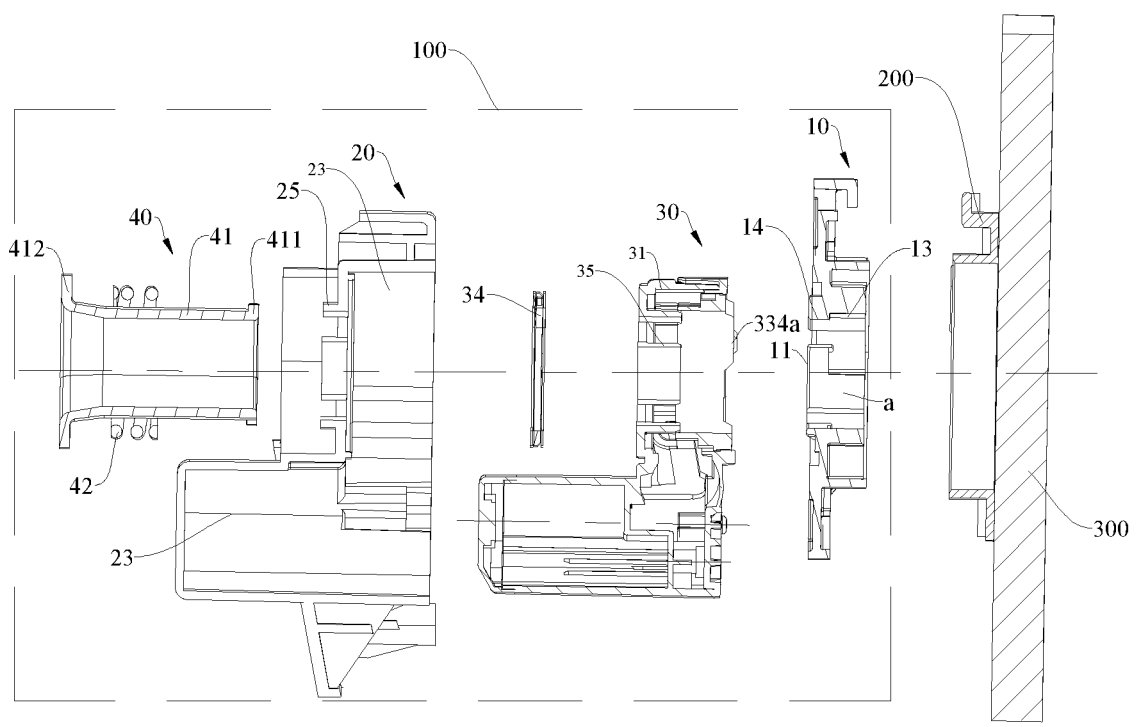
FIG. 2 is a schematic three-dimensional exploded view of a rotating mechanism for a display terminal, a display terminal, and a fixing bracket according to an embodiment of this application.

As shown in FIG. 1 and FIG. 2, the rotating mechanism 100 for the display terminal 300 according to the embodiment of this application includes: a base 20, a mounting unit 10, a drive unit 30, and a mounting shaft 41.

The base 20 is fixed with the vehicle body, and the mounting unit 10 is used to mount the display terminal 300. The mounting unit 10 may be fixedly connected to the display terminal 300 through a connecting bracket 400 disposed on the display terminal 300, and the connecting bracket 400 may be integrated on the back of the display terminal 300, or may be detachably connected to the display terminal 300. The connecting bracket 400 and the mounting unit 10 may be matched through a unified interface, so that display terminals 300 of different models or different sizes can be connected to the mounting unit 10 through a unified interface, so that the mounting unit 10 has better versatility and wider application range.

The mounting unit 10 has a first engaging portion 11, and the drive unit 30 is sandwiched between the base 20 and the mounting unit 10 in the axial direction. The drive unit 30 has a power output member capable of outputting torque, and the power output member has a second engaging portion 334a. A mounting shaft is pivotally disposed on the base 20, and the mounting shaft is connected to the mounting unit 10, so that the first engaging portion 11 and the second engaging portion 334a abut in the axial direction and are in power coupling connection.

It should be noted that the power coupling connection between the first engaging portion 11 and the second engaging portion 334a means that the manner in which the first engaging portion 11 is connected to the second engaging portion 334a can meet the requirement of stable torque transmission between the two. In other words, during the operation of the drive unit 30, the first engaging portion 11 and the second engaging portion 334a always remain relatively stationary.

To this end, the rotating mechanism can implement automatic rotation of the display terminal, thereby implementing rotation of the display terminal at any angle or rotation at a preset angle on a plane on which a display screen is located. In addition, the rotating mechanism implements modularization, good versatility, and convenient disassembly and assembly.

At least a part of clutch unit is located in the mounting unit 10. For example, at least a part of the first engaging portion 11 or the second engaging portion 334a in the foregoing embodiment is located in the rotating disk 16, so that the overall axial length of the rotating mechanism 100 can be significantly reduced, the arrangement is more compact and reasonable, and the connection is tighter.

The first engaging portion 11 may be splined or formed integrally with the rotating disk 16 as described in the foregoing embodiments. In other alternative embodiments, the first engaging portion 11 is constructed such that the rotating disk 16 faces an end surface of the engaging portion 334a, that is, first locking teeth 111 are formed on the end surface. In other words, a disk surface of the first engaging portion 11 is omitted, thereby reducing the weight of the entire rotating mechanism 100. The first locking teeth 111 may be integrally formed on the end surface of the rotating disk 16 facing the second engaging portion 334a, or the locking teeth may be detachably connected to the rotating disk 16, so that the structure of the rotating disk 16 is simpler, which facilitates molding.

The rotating disk 16 has a first groove 18 at one end facing the first engaging portion 11 of the clutch unit, and at least a part of the first engaging portion 11 is located in the first groove 18, to shorten the axial distance of the entire rotating mechanism 100. Preferably, as shown in the figure, the entire first engaging portion 11 is located in the first groove 18, and at least a part of the second engaging portion 334a of the clutch unit is located in the first groove 18. Further, the entire second engaging portion 334a is located in the first groove 18 to further shorten the axial distance of the entire rotating mechanism 100. The overall axial length of the rotating mechanism 100 is short, the arrangement is more compact and reasonable, and the connection is tighter.

Certainly, the rotating disk 16 may also be integrally formed with the first engaging portion 11, which can reduce the number of parts to be assembled and the assembly process.

The rotating mechanism 100 further includes a base 20, the drive unit 30 is disposed between the base 20 and the mounting unit 10, and the mounting unit 10 is pivotally connected to at least one of the drive unit 30 and the base 20. In this way, when the screen angle of the display terminal 300 needs to be rotated and switched, the drive unit 30 operates and rotates the power output member to drive the first engaging portion 11 and the second engaging portion 334a to rotate synchronously and drive the mounting unit 10 to rotate synchronously, to implement rotation, at any angle or at a preset angle on the plane on which the display screen is located, of the display terminal fixedly connected to the mounting unit 10.

In some embodiments, the mounting unit 10 includes a rotating disk 16 and a mounting shaft 41 connected to the rotating disk 16, the rotating disk 16 being pivoted on the drive unit 30 and the base 20 through the mounting shaft 41. Therefore, the mounting unit 10 and the drive unit 30 are integrated on the base 20 through the mounting shaft. In this way, the base, the mounting unit, and the drive unit are connected in series through the mounting shaft, thereby implementing the modularization of the rotating mechanism and having better universality.

In order to shorten the axial length of the entire rotating mechanism 100 and enhance the compactness of the entire mechanism, the drive unit 30 is disposed in the base 20, and the mounting shaft 41 passes through the base 20 and the drive unit 30 in turn to be connected to the rotating disk 16, so that the three are connected in series to maintain a certain positive pressure between all the units, and the torque of the power output member can be stably transmitted to the mounting unit 10 via the first engaging portion 11 and the second engaging portion 334a.

Those skilled in the art may set a target rotation angle of the display terminal 300 as needed. Specifically, when the target rotation angle is 90 degrees, the drive motor 32 may drive the display terminal 300 to rotate 90 degrees and lock the display terminal 300 after in place, which may be additionally provided with a locking mechanism, or the locking function may be integrated on the drive unit 30. For example, an electric mounting shaft is provided with a transmission mechanism with a self-locking function, which can implement the automatic rotation of the display terminal 300 and provide users with better audiovisual feeling and driving or taking experience.

In a specific embodiment shown in FIG. 1, the drive unit 30 may be embedded in the base 20, and the mounting shaft includes a mounting shaft 41, the mounting shaft 41 successively passing through the base 20 and the drive unit 30 and being inserted into the mounting unit 10 to be snapped into the mounting unit 10. In addition, the mounting shaft 41 is inserted into the mounting unit 10 after passing through the base 20 and the drive unit 30 in sequence, so that quick integration of the mounting unit 10 and the drive unit 30 on the base 20 can be implemented, which is more convenient for disassembly and assembly while significantly saving the time for mounting the product.

One end of the mounting shaft 41 has a plurality of snap-in convex portions 411 evenly distributed along the circumferential direction, and the base 20 and the power output member both have a plurality of slots b through which the plurality of snap-in convex portions 411 pass. The mounting unit 10 has a mounting hole a, an inner wall of the mounting hole a having a plurality of guide grooves 12 and a plurality of locking grooves 13 connected to end portions of the guide grooves 12, a limiting convex portion 14 being disposed at a transition between the locking groove 13 and the guide groove 12, and the snap-in convex portion 411 being clamped between the locking groove 13 and the limiting convex portion 14.

The snap-in convex portions 411 protrudes outward from a cylindrical side wall of the mounting shaft 41, each of the snap-in convex portions 411 being generally trapezoidal. The base 20 and the power output member also both have through holes for the cylindrical side wall of a snap-in shaft portion to pass, trapezoidal slots B for the snap-in convex portions 411 to pass being disposed in the through holes. The guide groove 12 guides the insertion of the snap-in convex portion 411, and the limiting convex portion 14 limits the snap-in convex portion 411 in the circumferential direction when the snap-in convex portion 411 enters the locking groove 13, so that the mounting shaft 41 can always be stably fixed with the mounting unit 10 when the mounting unit 10 rotates.

During mounting, the snap-in convex portion 411 of the mounting shaft 41 sequentially passes through the base 20 and the slot b of the power output member, and then the snap-in convex portion 411 enters the guide groove 12 and slides along the guide groove 12. When the snap-in convex portion 411 rotates the mounting shaft 41 toward the direction of the locking groove 13 after moving in place along the axial direction, the snap-in convex portion 411 enters the locking groove 13 and slides along the locking groove 13 until moving to the end of the locking groove 13. In this case, the limiting convex portion 14 and the locking groove 13 jointly limit the snap-in convex portion 411. As a result, the base 20, the mounting unit 10, and the drive unit 30 are integrated through the mounting shaft 41 by using the simple and compact structure.

Figure 8:
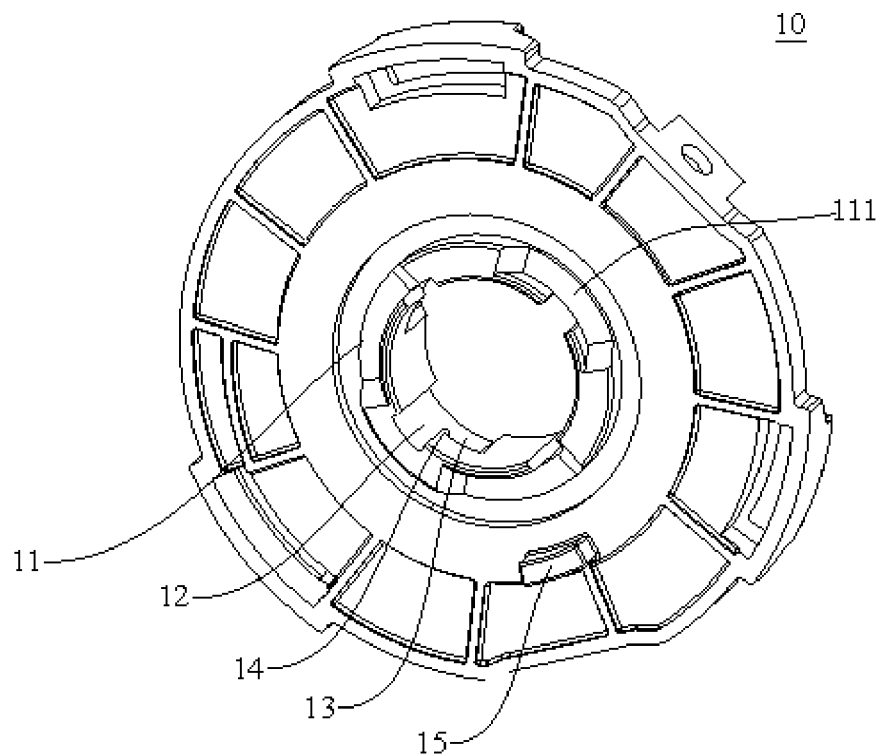
FIG. 8 is a schematic three-dimensional diagram of a mounting unit of a rotating mechanism for a display terminal according to an embodiment of this application.
Figure 9:
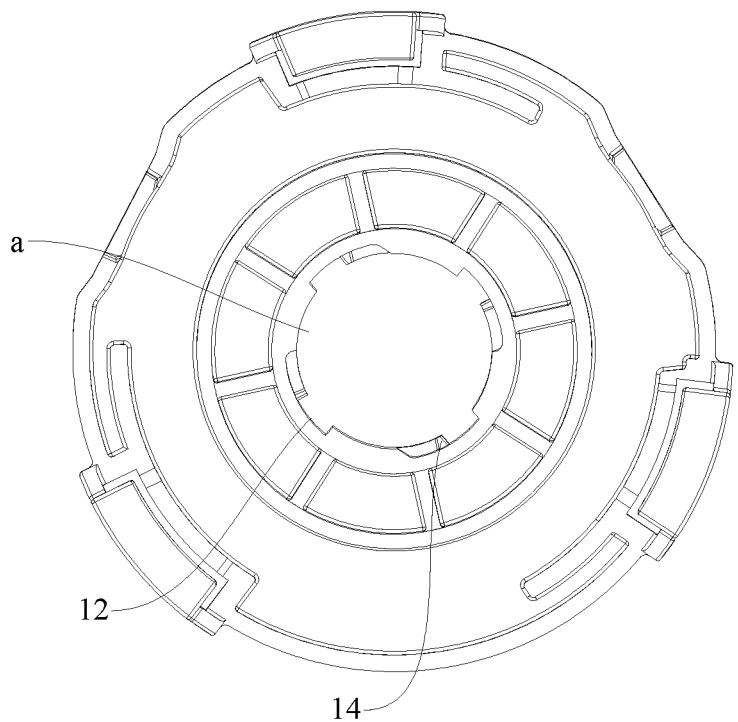
FIG. 9 is a rear view of a mounting unit of a rotating mechanism for a display terminal according to an embodiment of this application.
Figure 10:
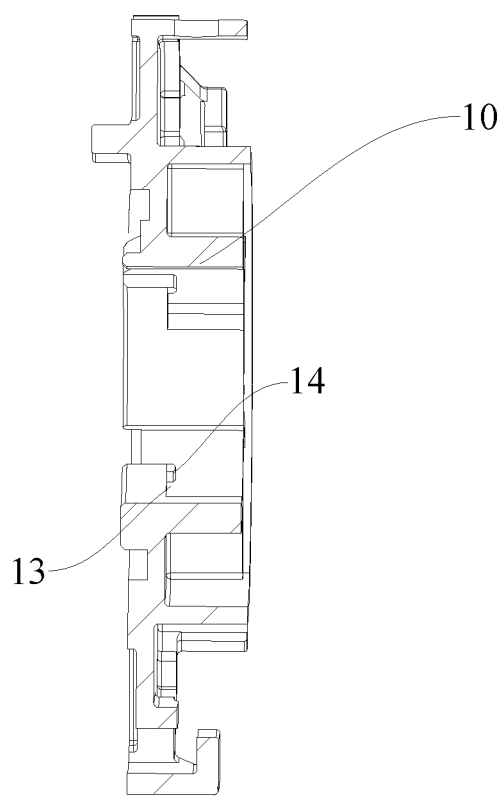
FIG. 10 is a cross-sectional view of a mounting unit of a rotating mechanism for a display terminal according to an embodiment of this application.

In specific embodiments shown in FIG. 8, FIG. 9, and FIG. 10, the guide grooves 12 extend along an axial direction of the mounting hole a, and the locking grooves 13 extend along a circumferential direction of the mounting hole a, each of the locking grooves 13 being connected to the guiding grooves 12 in a one-to-one correspondence manner and forming an L shape. Accordingly, when the mounting shaft 41 is mounted, quick mounting can be implemented by inserting first and then twisting, and the structure of the locking groove 13 is convenient for processing and production.

In order to further enhance the tightness of the connection between the mounting shaft and the mounting unit 10, the mounting shaft and the first engaging portion 11 may be integrally formed. Those skilled in the art may understand that a manner in which the mounting shaft 41 is connected to the mounting unit 10 is not limited to the foregoing manner, and the mounting shaft 41 may also be connected to the mounting unit 10 in other snap-in manners or other detachable mounting manners.

In the embodiment shown in FIG. 1 and FIG. 2, in order to further improve the anti-shake and anti-vibration performance of the display terminal 300, an elastic buffer structure may be disposed in the rotating mechanism 100. Specifically, the rotating mechanism 100 further includes an elastic member 42, one end of the mounting shaft 41 being connected to the mounting unit 10 and the other end thereof having a block 412, and the elastic member 42 being sleeved on the mounting shaft 41 and abutting between the block 412 and an end surface of the base 20.

By disposing the elastic member 42, sufficient positive pressure between the first engaging portion 11 and the second engaging portion 334a and for the transmission mechanism of the drive unit 30 can be maintained, to reduce the chattering and whirling of the display terminal 300 during driving due to existence of backlash of the transmission mechanism in the drive unit 30, and reduce the risk of damage to the transmission system caused by blurred image quality, chattering, and rattling during vibration and impact, thereby ensuring the anti-shake and anti-vibration performance of the transmission mechanism.

This can not only effectively reduce the impact on the display terminal 300 from road impact transmitted to the rotating mechanism 100 through the base 20, but also can reduce transmission failure due to external impact such as excessive pushing and pulling as a result of unexpected operations by a customer being transmitted to the drive unit 30 through the display terminal 300. The drive unit 30 is further protected, further improving reliability of the rotating mechanism 100.

Certainly, this application is not limited thereto. The method in which the positive pressure is obtained is not limited to the foregoing connection manner. The mounting shaft 41 may also be implemented by limiting one end of a shaft shoulder, by riveting the other end, and by tightening the shaft with a retaining ring or a nut.

Figure 3:
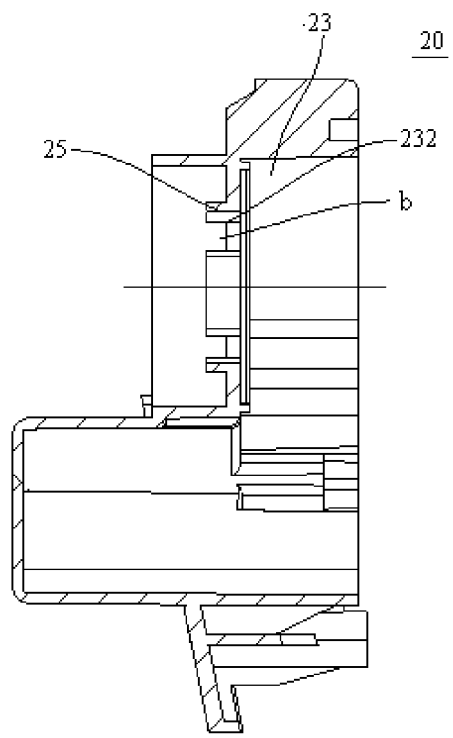
FIG. 3 is a cross-sectional view of a base of a rotating mechanism for a display terminal according to an embodiment of this application.
Figure 4:
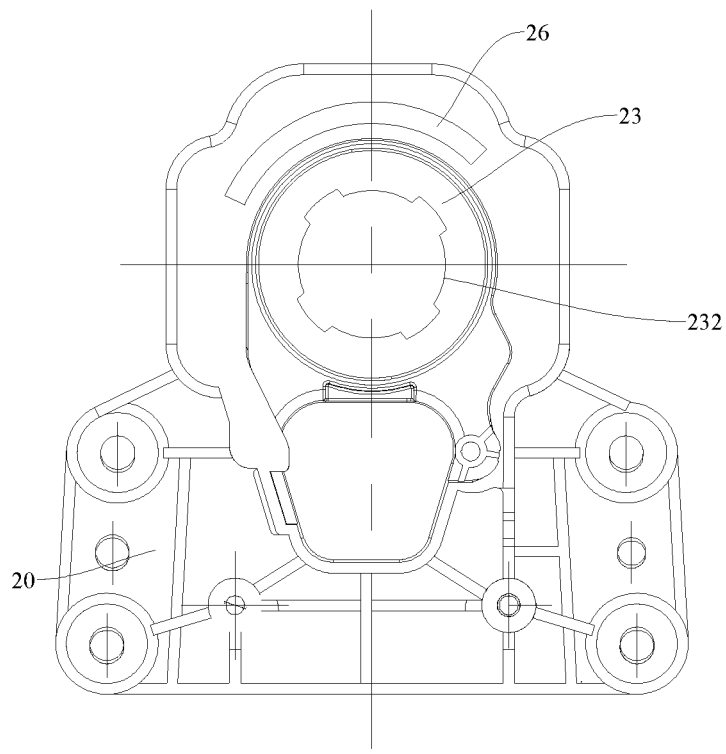
FIG. 4 is a rear view of a base of a rotating mechanism for a display terminal according to an embodiment of this application.

As shown in FIG. 3 and FIG. 4, the base 20 has a mounting groove 23, and the drive unit 30 is embedded in the mounting groove 23 with one end abutting against the bottom of the mounting groove 23. The mounting groove 23 has an avoiding through hole 232 for the mounting shaft 41 to pass through, an end portion of a housing 31 has a positioning shaft portion 25 surrounding the avoiding through hole 232, and the elastic member 42 abuts against the end surface of the base 20 through an end surface bearing 34 sleeved on the positioning shaft portion 25. Specifically, the elastic member 42 may be a compression spring. At this time, the positioning shaft portion 25 can function as a spring seat to provide center positioning for the elastic member 42. By adding an end surface bearing 34 between the spring and an end surface of the base 20, not only axial bearing capacity of the rotating mechanism 100 can be improved, but also the friction torque loss between the spring and the contact end surface of the base 20 can be reduced.

It may be understood that the housing can provide support for pivoting of the power output member, that is to say, the housing further has a hollow shaft sleeve, the power output member is pivotally sleeved on the hollow sleeve, and the mounting shaft is pivotally sleeved in the hollow sleeve.

To facilitate the wiring arrangement of the display terminal 300, the mounting shaft 41 is a hollow shaft, and the mounting shaft 41, the drive unit 30, and the mounting unit 10 jointly form a hollow structure. In this way, lines distributed outside of the rotating mechanism 100 may be concentrated in the hollow structure to make the line layout more beautiful and safer.

As shown in FIG. 9, the mounting unit 10 has a limiting post 15, and the base 20 has a limiting groove 26, the limiting post 15 being slidably disposed in the limiting groove 26 and being adapted to be matched with two ends of the limiting groove 26 to limit a stroke of the mounting unit 10. In this way, an in-place locking function can be implemented in combination with an electronic control component. When the display terminal 300 rotates 90 degrees, the limiting post 15 runs to the end of the limiting slot 26, the drive motor 32 of the drive unit 30 is locked, and the current increases. A control system can detect a blocking signal, a gyroscope built in the display terminal 300 transmits the in-place signal, which is identified by the control system, and the drive motor 32 is powered off, causing transmission of the power system to be interrupted and the system being locked in place.

Figure 11:
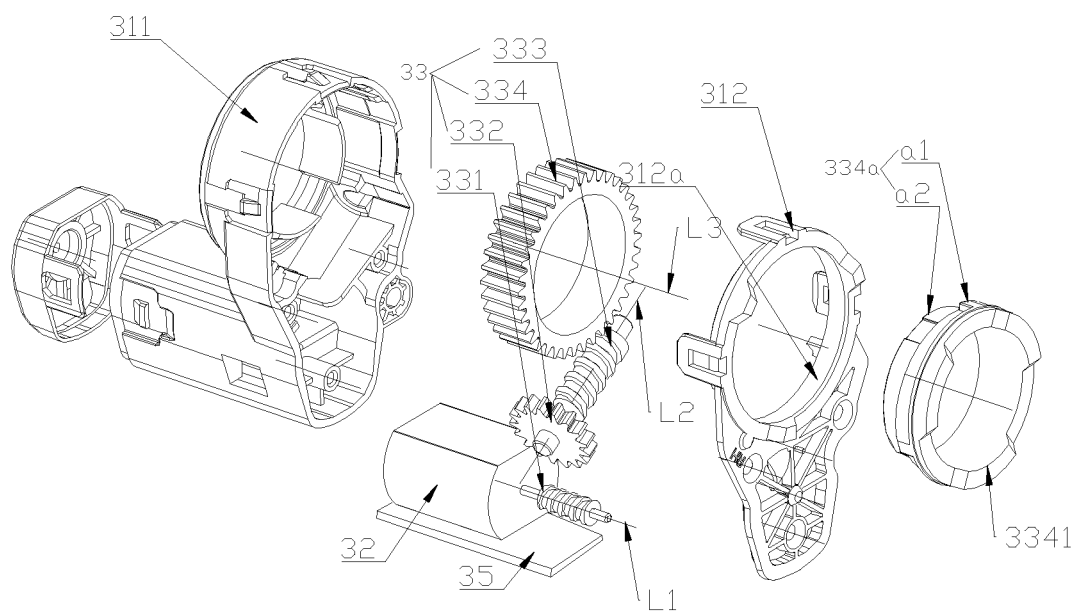
FIG. 11 is a schematic three-dimensional exploded view of a drive unit of a rotating mechanism for a display terminal according to an embodiment of this application.

As shown in FIG. 11, the drive unit 30 includes: a housing 31, a drive motor 32, and a speed reducer 33, the drive motor 32 being disposed in the housing 31 and having an output shaft. The speed reducer 33 is at least a first-stage transmission mechanism and includes at least a worm spur gear transmission mechanism. The worm spur gear transmission mechanism includes a worm and a spur gear that are meshed with each other, the worm being directly or indirectly connected to the output shaft of the drive motor 32, and the second engaging portion 334*a* being formed on the spur gear and extending out of the housing 31.

The drive motor 32 is a rotary drive motor 32, and the output shaft is a rotatable drive motor 32 capable of outputting torque. At least one of the speed reducer 33 and the drive motor 32 has a self-locking function. The speed reducer 33 can be a first-stage transmission mechanism, a second-stage transmission mechanism, and a third-stage transmission mechanism. A transmission mechanism includes at least a worm spur gear transmission mechanism. In the specific embodiment shown in the figure, when the speed reducer 33 is a second-stage transmission mechanism, the speed reducer 33 may be composed of a worm helical transmission mechanism and a worm spur gear transmission mechanism. The worm helical gear transmission mechanism includes a first-stage worm 331 and a first-stage helical gear 332 that are meshed with each other. The spur gear transmission mechanism includes a second-stage worm 333 and a second-stage spur gear 334 that are meshed with each other. The first-stage worm 331 is connected to the output shaft of the drive motor 32, the second-stage worm 333 and the first-stage helical gear 332 are coaxially disposed and fixedly connected, and the second-stage spur gear 334 is formed into a power output member.

The display terminal 300 needs to rotate at a very slow speed of about 6-10 r/min, which requires the speed reducer 33 to have a relatively large transmission ratio, about 10-2000. The worm spur gear transmission mechanism has the following advantages: a compact structure, a small size, and a light weight; stable transmission, low noise, a high transmission ratio, and an obvious deceleration effect.

It may be understood that a manner in which the drive unit 30 in this application is driven is not limited to an electric driving mode, which may also be a pneumatic, hydraulic, or magnetic driving mode. The speed reducer 33 is not limited to the transmission mechanism mentioned in the foregoing specific embodiments, which may also include a planetary gear transmission mechanism, a bevel gear transmission mechanism, and the like.

In some embodiments, the housing 31 includes: a housing body 311 and a front housing cover 312, the housing body 311 being configured to mount the drive motor 32 and the speed reducer 33. The front housing cover 312 is connected to the housing body 311 at a front end of the housing body 311, the spur gear being clamped between the housing body 311 and the front housing cover 312 in an axial direction, and the first engaging portion 11 extending forward out of the front housing cover 312.

In this way, the front housing cover 312 can provide axial limiting for the spur gear. Moreover, when the speed reducer 33 needs to be overhauled, the engagement condition between the spur gear and the worm can be observed by removing the front housing cover 312, or the spur gear can be directly replaced, which is convenient for disassembly and assembly.

Figure 5:
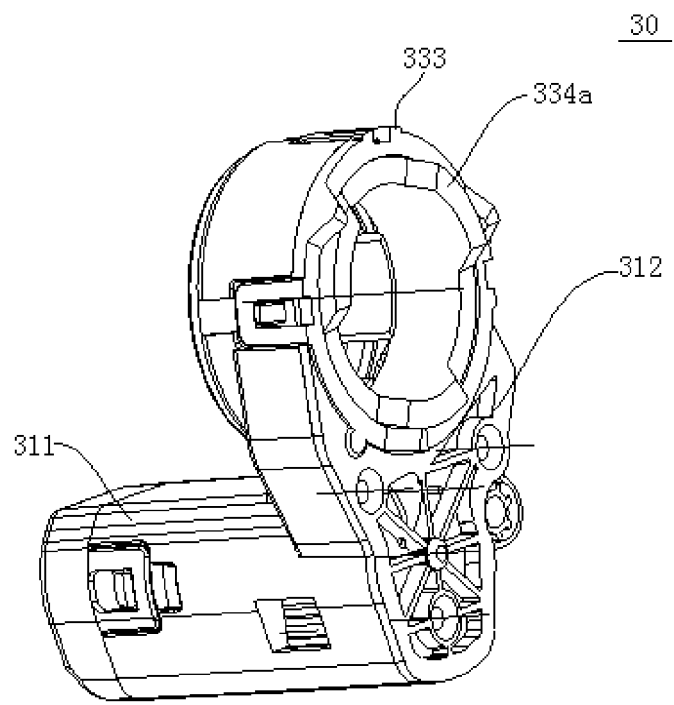
FIG. 5 is a schematic three-dimensional diagram of a drive unit of a rotating mechanism for a display terminal according to an embodiment of this application.
Figure 6:
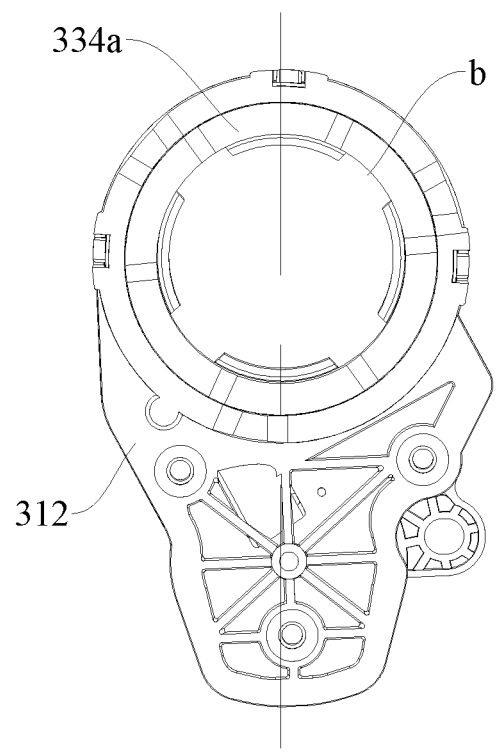
FIG. 6 is a front view of a drive unit of a rotating mechanism for a display terminal according to an embodiment of this application.
Figure 7:
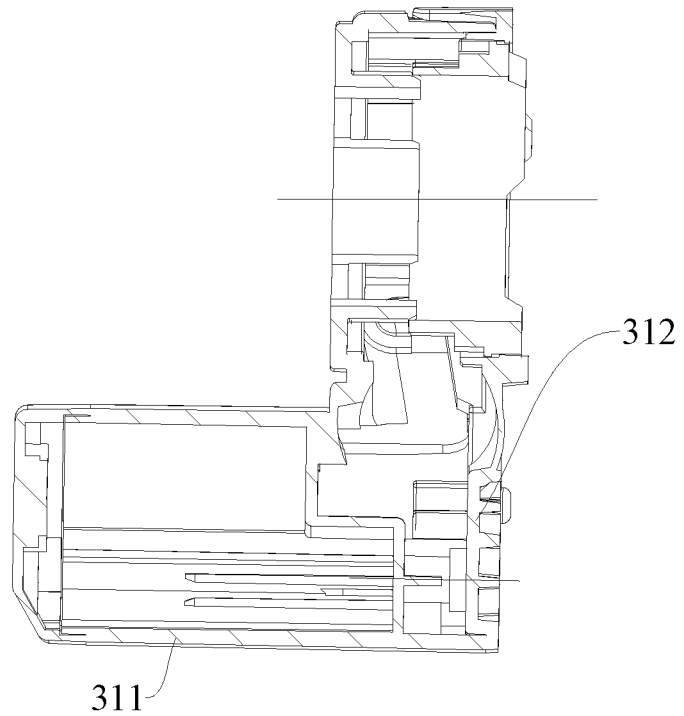
FIG. 7 is a cross-sectional view of a drive unit of a rotating mechanism for a display terminal according to an embodiment of this application.

As shown in FIG. 5, a housing 31 of the drive unit 30 has a radial holding mechanism, and the second engaging portion 334*a* may be relatively rotatably disposed on the radial holding mechanism for limiting in a radial direction. The radial holding mechanism is used to limit the radial offset of at least a part of the rotating mechanism to prevent the rotating mechanism 100 from being radially biased during operation, so that the rotating mechanism 100 can maintain stable operation after long-term operation.

Figure 12:
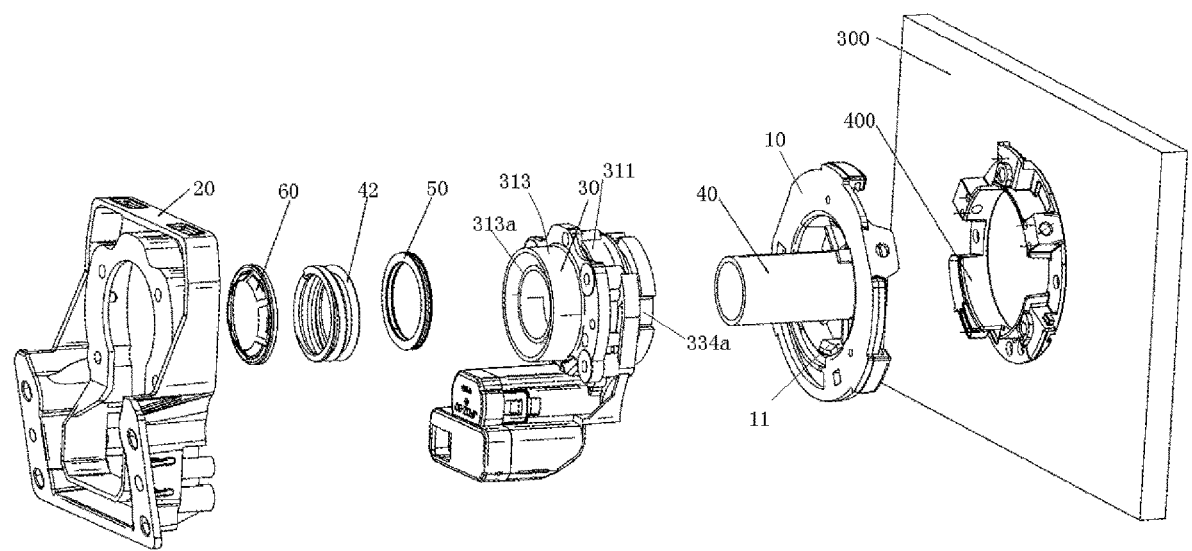
FIG. 12 is a schematic diagram of a rotating mechanism for a display terminal, a display terminal, and a fixing bracket according to another embodiment of this application.

In the embodiment shown in FIG. 12, the housing 31 of the drive unit 30 remains stationary after being mounted on the vehicle body. The housing 31 of the drive unit 30 has two hollow outer and inner rings. The radial holding mechanism includes the outer ring and the inner ring, the outer ring being sleeved on the inner ring, and the outer ring and the inner ring defining an annular cavity. At least a part of the second engaging portion 334*a* is disposed in the annular cavity, and at least a part of the second engaging portion 334*a* is sleeved on the inner ring. The inner ring is used to prevent the second engaging portion 334*a* from being biased radially inward, the outer ring is sleeved on at least a part of the second engaging portion 334*a*, and the outer ring is used to prevent the second engaging portion 334*a* from being biased radially outward.

The housing 31 of the drive unit 30 includes: a housing body 311, a housing rear cover 313, and the front housing cover 312. The housing rear cover 313 is connected to the housing body 311, the housing rear cover 313 has an annular second shaft portion 313*a*, the front housing cover 312 is connected to a front end of the housing body 311, and the front housing cover 312 has an annular limiting ring 312*a*, the limiting ring 312*a* being sleeved out of the second shaft portion 313*a* to define an annular cavity, at least a part of the second engaging portion 334*a* being disposed in the annular cavity. At least a part of the second engaging portion 334*a* is sleeved on the second shaft portion 313*a*, the second shaft portion 313*a* is used to prevent the second engaging portion 334*a* from being biased radially inward, and the limiting ring 312*a* is sleeved on the at least part of the second engaging portion 334*a*, the limiting ring 312*a* being used to prevent the second engaging portion 334*a* from being biased radially outward.

Certainly, this application is not limited thereto. In the embodiment shown in FIG. 11, an inner ring may also be formed on the mounting unit. Specifically, the housing 31 of the drive unit 30 includes: a housing body 311 and a front housing cover 312, the front housing cover 312 being connected to a front end of the housing body 311 and having an annular limiting ring 312*a*, the mounting unit 10 having a mounting shaft 41 passing the housing, and the limiting ring 312*a* being sleeved on the mounting shaft 41 to define an annular cavity, at least a part of the second engaging portion 334*a* being disposed in the annular cavity. At least a part of the second engaging portion 334*a* is sleeved on the mounting shaft 41, the mounting shaft 41 is used to prevent the second engaging portion 334*a* from being biased radially inward, and the limiting ring 312*a* is sleeved on the at least part of the second engaging portion 334*a*, the limiting ring 312*a* being used to prevent the second engaging portion 334*a* from being biased radially outward.

The power output member of the drive unit 30 includes an annular output gear. The output gear may be a second-stage driven spur gear in the foregoing embodiment, which is connected to the second engaging portion 334a and sleeved on the second shaft portion 313a. The second engaging portion 334a includes an engaging pad a1 to be locked with the second engaging portion 334a and a connecting sleeve a2 connected to one end of the engaging pad a1 away from the second engaging portion 334a, the connecting sleeve a2 being connected to the output gear, and the limiting ring 312a being sleeved on the connecting sleeve a2. In this way, radial inner and outer sides of the output gear are also respectively limited by the second shaft portion 313a and the limiting ring 312a, so that the output end of the drive unit 30 is not easily affected by external vibration during operation, thereby preventing rattling.

The radial holding mechanism may further include a radial limiting bearing not shown in the figure. A radial limiting bearing is disposed between the limiting ring and at least a part of the second engaging portion 334a. For example, the radial limiting bearing may be provided between the limiting ring and the connecting sleeve, so that the inner ring of the radial limiting bearing abuts against the connecting sleeve, and the outer ring of the radial limiting bearing abuts against the limiting ring, thereby ensuring that the radial limiting of the radial holding mechanism is more stable.

According to some embodiments of this application, the first engaging portion 11 forms a plurality of first locking teeth uniformly distributed along a circumferential direction on an end surface of the mounting unit 10, and the second engaging portion 334a forms a plurality of second locking teeth uniformly distributed along a circumferential direction on an end surface of the power output member, the plurality of first locking teeth and the plurality of second locking teeth being distributed crosswise in the circumferential direction and mutually locked in the circumferential direction. Therefore, the first locking teeth and the second locking teeth cooperate to implement the transmission of torque by the power output member to the mounting unit 10.

The first locking teeth 11118 and the second locking teeth 3341 are both trapezoidal, and two tooth sides of the first locking teeth 111 and the second locking teeth 3341 gradually approach from the tooth root to the tooth top. Specifically, respective two sides of each of the first locking teeth 111 and the second locking teeth 3341 are inclined surfaces that are close to each other and symmetrically distributed. In this way, the first locking teeth 111 and the second locking teeth 3341 are both trapezoidal teeth, which reduces slippage of the first engaging portion 11 and the first engaging portion 11 caused by excessive torque and enhances the stability of power transmission, so that the display terminal 300 can be switched more stably through electric control.

As shown in FIG. 12, in another embodiment of this application, the mounting unit 10 has a first groove 18 into which the second engaging portion 334a is inserted. The first engaging portion 11 includes a plurality of key teeth disposed in the first groove 18, and the second engaging portion 334a includes a plurality of key grooves on the outer side wall of the power output member, the key grooves and the key teeth forming a spline connection. Therefore, when the drive unit 30 operates, the output torque is directly transmitted to the mounting unit 10 through the second engaging portion 334a and the first engaging portion 11, so that the power output member drives the mounting unit 10 to rotate synchronously, thereby implementing automatic rotation of the display terminal screen.

In order to implement the axial limiting of the mounting unit 10 and eliminate the transmission clearance of the drive unit 30, the following structure may be adopted. The mounting shaft 41 may be a rotating shaft integrated on the mounting unit 10, and the mounting shaft 41 passes through the drive unit 30 and is axially limited by using a limiting retainer ring 60, the limiting retainer ring 60 fixing the mounting shaft 41, and a spring may be disposed between the limiting retainer ring 60 and the end portion of the base 20.

It should be noted that the embodiments of the mounting unit 10, the mounting shaft, and the drive unit 30 may be combined with each other without conflict to form more embodiments about the rotating mechanism 100.

A structure of the drive unit 30 of the rotating mechanism 100 of the embodiment of this application is described below.

As shown in FIG. 11, the drive unit 30 includes: a drive motor 32 and a speed reducer 33, an output shaft of the drive motor 32 being connected to the speed reducer 33, and the power output member of the speed reducer 33 having a second engaging portion 334a.

A worm spur gear reduction mechanism is adopted, which has a compact structure, a small volume, and a light weight with stability in transmission and low noise. The whole reduction mechanism has a flexible layout, convenient for routing, is more suitable for the requirements of compact space of the whole vehicle mechanism and weight limitation of the whole vehicle, and can also provide a user with better driving experience.

An included angle between an axis of a driving worm and an axis of a driven spur gear is an acute angle. An included angle between an axis L1 of a driving worm and an axis L2 of a driven spur gear is an acute angle α, thereby satisfying the inequality $82°≤A≤88°$. Further, $84°≤α≤86°$, for example, α=85°, and the magnitude of α is determined according to a helix angle of the driving worm.

In other words, the driving worm and the driven spur gear are not vertically arranged, so that the meshing state between the driving worm and the driven spur gear is good and the transmission efficiency is higher. The spur gear is convenient for machining, and the worm gear transmission in the related art is improved to worm spur gear transmission, there avoiding the problem of poor performance of worm gear machining.

In some embodiments, the speed reducer 33 is a first-stage transmission mechanism and includes: a first-stage worm 331 and a first-stage gear 332, the first-stage worm 331 being fixedly connected to the output shaft of the drive motor 32, and the first-stage worm 331 being meshed with the first-stage gear 332, and an included angle between an axis of the first-stage worm 331 and an axis of the first-stage gear 332 being an acute angle. An included angle between the axis L1 of the first-stage worm 331 and the axis L2 of the first-stage gear 332 is α, thereby satisfying the inequality $82°≤A≤88°$. Further, $84°≤α≤86°$, for example, α=85°, and the magnitude of α is determined according to a helix angle of the first-stage worm 331. In other words, the first-stage worm 331 and the first-stage gear 332 are not vertically arranged, so that the meshing state between the first-stage worm 331 and the first-stage gear 332 is good and the transmission efficiency is higher. The spur gear is convenient for machining, and the worm gear transmission in the related art is improved to worm spur gear transmission, there avoiding the problem of poor performance of worm gear machining.

In some other embodiments, as shown in the figure, the second-stage transmission mechanism includes: a first-stage worm 331, a first-stage gear 332, a second-stage worm 333, and a second-stage spur gear 334.

The output shaft of the drive motor 32 is fixedly connected to the first-stage worm 331, and the first-stage worm 331 may be integrated outside the output shaft of the drive motor 32.

The first-stage worm 331 is meshed with the first-stage gear 332, an included angle between the axis of the first-stage worm 331 and the axis of the first-stage gear 332 is an acute angle, and an included angle between the axis L1 of the first-stage worm 331 and the axis L2 of the first-stage gear 332 is α, thereby satisfying the inequality 82°≤A≤88°. Further, 84°≤α≤86°, for example, α=85°, and the magnitude of α is determined according to a helix angle of the first-stage worm 331. In other words, the first-stage worm 331 and the first-stage gear 332 are not vertically arranged, so that the meshing state between the first-stage worm 331 and the first-stage gear 332 is good and the transmission efficiency is higher. The spur gear is convenient for machining, and the worm gear transmission in the related art is improved to worm spur gear transmission, there avoiding the problem of poor performance of worm gear machining.

The second-stage worm 333 and the first-stage gear 332 are coaxially disposed, and disposed at intervals in an axial direction. The second-stage worm 333 and the first-stage gear 332 may be integrally machined, or the first-stage gear 332 may be connected to the second-stage worm 333 through splines.

The second-stage spur gear 334 is meshed with the second-stage worm 333. An included angle between the axis of the second-stage worm 333 and the axis of the second-stage spur gear 334 is an acute angle, and an included angle between an axis L2 of the second-stage worm 333 and an axis L3 of the second-stage spur gear 334 is β, thereby satisfying the inequality 82°≤β≤88°. Further, 84°≤β≤86°, for example, β=85°, and the magnitude of β is determined according to a helix angle of the second-stage worm 333. In other words, the second-stage worm 333 and the second-stage spur gear 334 are not vertically arranged, so that the meshing state between the second-stage worm 333 and the second-stage spur gear 334 is good and the transmission efficiency is higher. The spur gear is convenient for machining, and the worm gear transmission in the related art is improved to worm spur gear transmission, there avoiding the problem of poor performance of worm gear machining.

The axis of the first-stage worm 331 and the axis of the second-stage spur gear 334 are parallel to each other. The axis of the output shaft of the drive motor 32 is parallel to and spaced apart from the axis of the second-stage spur gear 334. Therefore, the arrangement direction of the drive motor 32 is parallel to the output direction of the drive unit 30, which is convenient for assembly design.

A worm spur gear reduction mechanism is adopted, which has a compact structure, a small volume, and a light weight with stability in transmission and low noise. The whole reduction mechanism has a flexible layout, convenient for routing, is more suitable for the requirements of compact space of the whole vehicle mechanism and weight limitation of the whole vehicle, and can also provide a user with better driving experience.

The first-stage gear 332 transmits the high-speed rotation of the first-stage worm 331 to the second-stage worm 333. To reduce the vibration during transmission, the first-stage gear 332 may be a plastic member, while the first-stage worm 331, the second-stage worm 333, and the second-stage spur gear 334 are metal members.

The second-stage spur gear 334 is connected to the first engaging portion 11, to implement power output. For example, the second-stage spur gear 334 and the first engaging portion 11 are integrated. According to function requirements of the second-stage spur gear 334 and the first engaging portion 11, the two may be made of different materials. The second-stage spur gear 334 is made of a wear-resistant material, and the first engaging portion 11 is made of a self-lubricating material.

In this application, the movement adopts planetary gear train or a second-stage worm and a helical gear transmission system, so that the rotating mechanism 100 has the following advantages: (1) a compact structure, a small size, and a light weight; (2) stable transmission and low noise; (3) flexible layout, convenient for wiring. The mechanism is more suitable for the requirements of compact space of the whole vehicle mechanism and weight limitation of the whole vehicle, and can also provide a user with better driving experience. In addition, the unique in-place locking system in this application can effectively isolate the transmission system inside the movement from external impact, not only avoiding the chattering and whirling of the display screen caused by the internal backlash of the transmission system, and the like, but also improving system stability and anti-shake and anti-vibration performance, so that damage to the transmission system is prevented from external impact, and system reliability and life can be improved.

A rotating mechanism 100 of a display screen according to a specific embodiment of this application is described below with reference to FIG. 1. The display screen may be a touch screen capable of performing man-machine interaction.

As shown in FIG. 1, the connecting bracket 400 behind the display screen may be fixedly connected to the rotating disk 16 (that is, the mounting unit 10 in the embodiment above) through a buckle and two screws. The rotating disk 16, the movement (the drive unit 30), the base 20, the spring (that is, the elastic member 42), and the end surface bearing 34 are sequentially connected in series through the mounting shaft 41, and are fixedly connected to the buckle of the rotating disk 16 and the shoulder of the mounting shaft 41 to limit an axial length of the system, so that a certain positive pressure is maintained between the components connected in series to implement the system locking. Herein, in addition to the solution of this specification, the method of obtaining the positive pressure by implementing the axial limiting between the components may also be the method of limiting one end of a shaft shoulder, riveting the other end, and tightening the shaft with a retaining ring or a nut. The rotating disk 16 and the movement are connected and transmit torque through transverse teeth. The movement and the base 20 are limited by using a shaft shoulder and a rib, and compressed and fixed by the positive pressure between the two, or may be fixedly connected by using other fixing methods. By adding an end surface bearing 34 between the spring and an end surface of the base 20, axial bearing capacity of the system can be improved, and the friction torque loss between the spring and the contact end surface of the base 20 can be reduced during operation. A rear portion of the rotating disk 16 is provided with a limiting post 15, and a corresponding position of the end surface of the base 20 is designed with a 90° avoidance track (that is, the limiting slot 26), the two cooperating to achieve 90° in-place locking.

(1) Power transmission route of the rotating system: after decelerating and twisting the output torque of the drive motor 32, the movement transmits the torque to the rotating disk 16 through the end surface teeth of its own power output member, driving the rotating disk 16 to realize planar rotation, thereby driving the connecting bracket 400 and the display screen fixedly connected to perform planar rotation. When the rotating disk rotates 90 degrees, the limiting post 15 at the rear of the rotating disk 16 runs to the end of the track. The drive motor 32 is locked, and the current increases. A control system can detect a blocking signal, a gyroscope built in the display screen transmits the in-place signal, which is identified by the control system, and the drive motor 32 is powered off, causing transmission of the power system to be interrupted and the system being locked in place.

(2) In-place locking and protection system: in-place locking of this system is ensured by the positive pressure exerted by the spring on the movement and two toothed connection end surfaces of the rotating disk 16 through the end surface bearing 34. The system positive pressure between the toothed contact surfaces is large enough to effectively isolate the impact of road impact transmitted to the system through the base 20 on the display screen, and prevent the transmission failure caused by the unexpected operation (external impact such as excessive pushing and pulling) of a customer transmitted to the transmission system through the display screen, thereby effectively protecting the transmission system and further improving the reliability of the system. This system does not use the self-locking performance of the worm and helical gear inside the movement to realize locking, but independently designs the locking system. This design can effectively prevent the risk of damage to the transmission system caused by blurred image quality, chattering, and rattling during vibration and impact due to the chattering and whirling of the display screen due to existence of backlash in the movement, thereby ensuring the anti-shake and anti-vibration performance of the system.

(3) In order to consider the driving experience of the customer, the system display screen rotates at a very slow speed (about 6-10 r/min), which requires the movement to have a relatively large transmission ratio, about 300-600. The planetary gear reducer 33 or a double worm reduction system of second-stage worm and helical gear can be selected according to the specific structure layout, which is designed as a hollow structure to facilitate the design of the locking system.

(4) The rotating system uses an embedded current-limiting circuit board 35, and when a current exceeding a set threshold is detected, the drive motor 32 is powered off, thereby implementing safety anti-pinch and overload protection of the system.

(5) In-place and abnormal position control: The system rotates in place or the display screen encounters external resistance and causes the anti-pinch indication to start, which depends on the current rise. To exceed the design threshold of the current-limiting plate, the system powers off the drive motor 32. After the drive motor 32 is powered off, the control system will determine whether the display screen is in an abnormal position according to the signal transmitted by the built-in gyroscope of the display screen. If the signal transmitted by the gyroscope indicates that the display screen is in the horizontal or vertical screen position, it means that the drive motor 32 is powered off in place. Otherwise, it is determined that the display screen is in an abnormal position. If it is determined that the drive motor 32 is powered off due to an abnormality, a warning screen appears to remind the customer to check for foreign objects. When the resistance disappears, the system is restarted according to a choice of the customer.

(6) The mounting shaft 41 has a hollow design for easy wiring, so that the wiring harness behind the screen is reasonable and beautiful.

(7) The system is a centering rotation system, that is, the rotation center always remains unchanged during the rotation. Therefore, the connecting bracket 400 with a unified interface can be used to implement matching and compatibility between multi-size terminals.

(8) The display screen of the system is suspended in the central control, which can make an instrument panel cleaner and more beautiful.

For the rotating mechanism 100 of the display screen of this application, the system can implement the following functions: (1) automatic switching between horizontal and vertical display screens, (2) automatic positioning and locking after rotating in place, (3) system anti-shake and anti-vibration, (4) system overload protection and safety anti-pinch, and (5) matching and compatibility between multi-size terminals.

This application is mainly used for the rotating mechanism of the display screen, and is also applicable to other electronic products with rotation requirements.

It should be noted that the embodiments of the mounting unit 10, the mounting shaft, and the drive unit 30 may be combined with each other without conflict to form more embodiments about the rotating mechanism 100.

Figure 13:
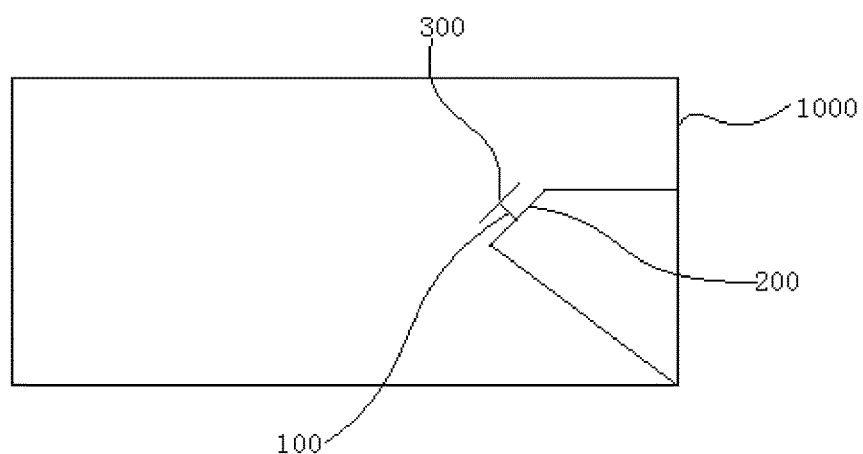
FIG. 13 is a schematic diagram of a vehicle according to this application.

As shown in FIG. 13, the vehicle 1000 according to an embodiment of a second aspect of this application includes: a display terminal 300 and a mounting assembly of the foregoing embodiment, the fixed bracket 200 being mounted on a body of the vehicle 1000, and the display terminal 300 being mounted to the mounting unit 10 of the rotating mechanism 100. Therefore, the vehicle 1000 adopts the rotating mechanism 100 for adjusting the display terminal 300 with anti-shake, anti-vibration, anti-pinch, and performance, which can not only realize automatic switching between horizontal and vertical screens, but also provide users with a better operating experience and audiovisual enjoyment. In addition, the automatic rotation is equipped with stable and reliable in-place locking and anti-backlash systems, which can effectively avoid screen blurring or vibration damage caused by screen shaking caused by road impact during driving.

It should be noted that the foregoing display terminal 300 may be multimedia, navigation, or display screen disposed inside the vehicle 1000. The display terminal 300 is not required to be integrated on the vehicle 1000 when the vehicle 1000 leaves the factory, which may not be disposed on the center console of the vehicle 1000 during delivery but may be applied and integrated on the vehicle 1000.

In the description of this application, it should be understood that orientation or position relationships indicated by the terms such as "center", "longitudinal", "transverse", "length", "width", "thickness", "on", "below", "front", "back", "left", "right", "vertical", "horizontal", "top", "bottom", "inside", "outside", "clockwise", "anticlockwise", "axial direction", "radial direction", and "circumferential direction" are based on orientation or position relationships shown in the accompanying drawings, and are used only for ease and brevity of illustration and description, rather than indicating or implying that the mentioned apparatus or component must have a particular orientation or must be constructed and operated in a particular orientation. Therefore, such terms should not be construed as limiting of this application.

In addition, terms "first" and "second" are only used to describe the objective and cannot be understood as indicating or implying relative importance or implying a quantity of the indicated technical features. Therefore, features defining "first" and "second" can explicitly or implicitly include at least one of the features. In description of this application, "multiple" means at least two, such as two and three unless it is specifically defined otherwise.

In this application, unless otherwise explicitly specified or defined, the terms such as "install", "connect", "connection", and "fix" should be understood in a broad sense. For example, the connection may be a fixed connection, a detachable connection, or an integral connection; or the connection may be a mechanical connection or an electrical connection or may communicate with each other; or the connection may be a direct connection, an indirect connection through an intermediary, or internal communication between two elements or mutual action relationship between two elements, unless otherwise specified explicitly. A person of ordinary skill in the art may understand the specific meanings of the foregoing terms in this application according to specific situations.

In this application, unless otherwise explicitly specified or defined, the first feature being located "above" or "below" the second feature may be the first feature being in a direct contact with the second feature, or the first feature being in an indirect contact with the second feature through an intermediary. In addition, the first feature being located "above" the second feature may be the first feature being located directly above or obliquely above the second feature, or may simply indicate that the first feature is higher in level than the second feature. The first feature being located "below" the second feature may be the first feature being located directly below or obliquely below the second feature, or may simply indicate that the first feature is lower in level than the second feature.

In description of the present disclosure, description of reference terms such as "one embodiment", "some embodiments", "example", "specific example" or "some examples" means including specific features, structures, materials, or features described in the embodiment or example in at least one embodiment or example of the present disclosure. In this specification, schematic descriptions of the foregoing terms do not necessarily direct at a same embodiment or example. In addition, the described specific features, structures, materials, or features can be combined in a proper manner in any one or more embodiments or examples. In addition, in a case that is not mutually contradictory, a person skilled in the art can combine or group different embodiments or examples that are described in this specification and features of the different embodiments or examples.

Although the embodiments of this application are shown and described above, it can be understood that, the foregoing embodiments are exemplary, and cannot be construed as a limitation to this application. Within the scope of the present invention, a person of ordinary skill in the art may make changes, modifications, replacement, and variations to the foregoing embodiments.

What is claimed is:

1. A rotating mechanism for a display terminal, comprising:
    a mounting unit configured to mount a display terminal;
    a clutch unit comprising a first engaging portion and a second engaging portion, wherein the first engaging portion is connected to the mounting unit;
    a drive unit having a power output member capable of outputting torque, wherein the power output member is detachably connected to the second engaging portion and is capable of transmitting torque, and the first engaging portion and the second engaging portion are in power coupling connection; and
    a base, wherein the drive unit is disposed between the base and the mounting unit in an axial direction.

2. The rotating mechanism for a display terminal according to claim 1, wherein the clutch unit is located outside a housing of the drive unit; and at least a part of the clutch unit is located in the mounting unit.

3. The rotating mechanism for a display terminal according to claim 2, wherein the mounting unit comprises a rotating disk for mounting the display terminal, the rotating disk is connected to the first engaging portion, one end of the rotating disk facing the first engaging portion has a first groove, and at least a part of the first engaging portion is located in the first groove; and at least a part of the second engaging portion is located in the first groove.

4. The rotating mechanism for a display terminal according to claim 1, wherein the mounting unit comprises a rotating disk for mounting the display terminal, the rotating disk is integrally formed with the first engaging portion.

5. The rotating mechanism for a display terminal according to claim 1, wherein the mounting unit comprises a rotating disk for mounting the display terminal, the first engaging portion is detachably connected to the rotating disk.

6. The rotating mechanism for a display terminal according to claim 1, wherein a housing of the drive unit has a radial holding mechanism, the second engaging portion is relatively rotatably disposed on the radial holding mechanism for limiting in a radial direction.

7. The rotating mechanism for a display terminal according to claim 6, wherein the radial holding mechanism includes an outer ring and an inner ring that define an annular cavity, wherein the inner ring is formed on at least one of the mounting unit and the housing of the drive unit, wherein the outer ring is sleeved on the inner ring, and wherein at least a part of the second engaging portion is disposed in the annular cavity.

8. The rotating mechanism for a display terminal according to claim 1, wherein a housing of the drive unit comprises: a housing body and a front housing cover, the front housing cover is connected to a front end of the housing body and has an annular limiting ring, the mounting unit has a mounting shaft passing through the housing, and the limiting ring is sleeved on the mounting shaft to define an annular cavity, at least a part of the second engaging portion is disposed in the annular cavity; and a radial limiting bearing is provided between the limiting ring and the at least a part of the second engaging portion.

9. The rotating mechanism for a display terminal according to claim 8, wherein the power output member of the drive unit comprises an annular output gear connected to the second engaging portion and sleeved on a shaft sleeve; and the second engaging portion comprises an engaging pad to be locked with the second engaging portion and a connecting sleeve connected to one end of the engaging pad away from the second engaging portion, the connecting sleeve is connected to the output gear, and the limiting ring is sleeved on the connecting sleeve.

10. The rotating mechanism for a display terminal according to claim 1, wherein the mounting unit is pivotally connected to at least one of the drive unit and the base.

11. The rotating mechanism for a display terminal according to claim 1, wherein the mounting unit comprises a rotating disk and a mounting shaft connected to the rotating disk, the rotating disk is provided on the drive unit and the base through the mounting shaft; and the drive unit is disposed in the base, and the mounting shaft successively passes through the base and the drive unit to be connected to the rotating disk.

12. The rotating mechanism for the display terminal according to claim 11, wherein the mounting shaft is inserted into the mounting unit to be snapped into the mounting unit, one end of the mounting shaft has a plurality of snap-in convex portions uniformly distributed along a circumferential direction, and both the base and the power output member have a plurality of slots for the plurality of snap-in convex portions to pass through; and the mounting unit has a mounting hole, an inner wall of the mounting hole has a plurality of guide grooves and a plurality of locking grooves connected to end portions of the guide grooves, a limiting convex portion is disposed at a transition between the locking groove and the guide groove, and the snap-in convex portion is clamped between the locking groove and the limiting convex portion.

13. The rotating mechanism for a display terminal according to claim 12, wherein the guide grooves extend along an axial direction of the mounting hole, and the locking grooves extend along a circumferential direction of the mounting hole, the locking grooves are connected to the guiding grooves in a one-to-one correspondence manner and form an L shape.

14. The rotating mechanism for a display terminal according to claim 11, further comprising an elastic member, wherein one end of the mounting shaft is connected to the mounting unit and the other end thereof has a block, and the elastic member is sleeved on the mounting shaft and abutting between the block and an end surface of the base.

15. The rotating mechanism for a display terminal according to claim 11, further comprising the base having a mounting groove for accommodating the drive unit, wherein the mounting groove has an avoiding through hole for the mounting shaft to pass through, an end portion of the base has a positioning shaft portion surrounding the avoiding through hole, and the elastic member abuts against the end surface of the base through an end surface bearing sleeved on the positioning shaft portion.

16. The rotating mechanism for a display terminal according to claim 11, further comprising the mounting shaft is a hollow shaft; the mounting shaft is integrally formed with or detachably connected to the rotating disk; and the mounting unit has a limiting post, and the base has a limiting groove, the limiting post is slidably disposed in the limiting groove and is configured to be matched with two ends of the limiting groove to limit a stroke of the mounting unit.

17. The rotating mechanism for a display terminal according to claim 1, wherein the first engaging portion comprises a plurality of first locking teeth uniformly distributed along a circumferential direction on an end surface of the mounting unit, and the second engaging portion comprises a plurality of second locking teeth uniformly distributed along a circumferential direction on an end surface of the power output member, the plurality of first locking teeth and the plurality of second locking teeth are distributed crosswise in the circumferential direction and mutually locked in the circumferential direction; and the first locking tooth and the second locking tooth are both trapezoidal, and respective two sides of each of the first locking teeth and each of the second locking teeth are inclined surfaces that are close to each other and symmetrically distributed.

18. The rotating mechanism for the display terminal according to claim 1, wherein the drive unit comprises:
a housing;
a drive motor disposed in the housing and having an output shaft; and
a speed reducer, wherein the speed reducer is at least a first-stage transmission mechanism and comprises at least a worm spur gear transmission mechanism, the worm spur gear transmission mechanism comprises a worm and a spur gear that are meshed with each other, the worm is directly or indirectly connected to the output shaft of the drive motor, the spur gear is formed into a power output member, and the second engaging portion is formed on the spur gear and extends out of the housing.

19. The rotating mechanism for a display terminal according to claim 18, wherein the housing comprises:
a housing body configured to mount the drive motor and the speed reducer; and
a front housing cover connected to the housing body at a front end of the housing body, wherein the spur gear is clamped between the housing body and the front housing cover in an axial direction, and the first engaging portion extends out of the front housing cover.

20. A vehicle, comprising:
a display terminal; and
the rotating mechanism according to claim 1, wherein the display terminal is mounted to the mounting unit of the rotating mechanism.

* * * * *